UNITED STATES PATENT OFFICE.

HENRY M. HARTSHORN, OF MALDEN, MASSACHUSETTS.

IMPROVEMENT IN PROCESSES FOR MANUFACTURING GLUCOSE.

Specification forming part of Letters Patent No. 218,020, dated July 29, 1879; application filed April 26, 1878.

*To all whom it may concern:*

Be it known that I, HENRY MARTYN HARTSHORN, of Malden, in the county of Middlesex and State of Massachusetts, have made an invention of certain new and useful Improvements in the Art of Manufacturing Glucose; and that the following is a full, clear, and exact description and specification of the same.

Previous to my present invention glucose has been manufactured from the material known by the several names of Indian corn, corn, and maize, by two general systems. According to one system the grain corn is soaked in water, or in water acidulated with sulphuric acid, and is ground, while in a wet state, into meal or flour. The starch is separated from the wet product by washing, and is then transformed into glucose by the well-known sulphuric-acid process. According to the other system, the corn is ground into meal, or otherwise comminuted, and the corn-meal, which contains all the constituents of the grain corn, is directly treated either by the sulphuric-acid process or by the diastase process to transform the starchy matter of the corn-meal into glucose.

The first of the two systems is objectionable because all the free sugar that exists in the corn is lost in the soaking and washing operations used to separate the starch from the gluten, and, further, because of the labor and expense of separating the starch by the washing process preliminary to the transformation into glucose. The second of the two systems also is objectionable because the transformation of the starch into glucose is effected in the presence of the whole of the oily matter of the corn which is contained in the corn-meal. Hence this oily matter has to be separated from the glucose after its production, while its presence during the transformation of the starch has the practical effect of reducing the product of glucose materially below that which the corn should yield according to its chemical constitution.

Both of the above systems are further objectionable because the portions of the corn containing such oily matter are in each case separated in a wet state or condition, the wet condition being due in the first system to the soaking and washing operations or treatment of the corn-meal with a liquid, (water or weak acid,) and the wet condition being due in the second system to the treatment of the corn-meal with liquids in order to transform the starch into glucose. The oil-containing portion of the corn separated in this wet state is highly susceptible to fermentation, which injures its quality. Hence it must be consumed immediately; and even when the wet oil-containing matter is unfermented, it is of but low value as compared with the value of the grain corn or corn-meal, from which it is made.

The object of the present invention is to reduce the cost of manufacturing glucose from Indian corn and to obtain a product of superior quality.

To these ends the first part of my invention consists of a compound process, the first step or operation of which consists of the dry granulation of the corn or reduction of the kernels by a dry clipping and cracking treatment, the effect of which is to reduce the kernels to coarse fragments and to detach oil-containing portions of the kernels in the form of hulls and fine matter from the fragments. The second step of the process consists of the dry purification of the granular starchy portions of the kernels from the detached oil-containing portions, and may be effected by sifting and winnowing the product of the first step, or by either of these operations, thereby removing the hulls and fine matter and leaving the granular portions in a purified condition. The third step in the process consists of the reduction of the purified granular product of the first and second operations to corn-meal or corn-flour, which is most readily effected by grinding it. The fourth step of the process consists of the transformation of the starch of the corn-flour obtained by the preceding two steps into glucose by a treatment sufficient for that purpose, which treatment may be either the diastase treatment or the sulphuric-acid treatment, as deemed expedient.

The second part of my invention consists of the new manufacture of improved depurated glucose obtained by the compound process which constitutes the first part of my invention.

I have found that the hulls and fine matter obtained by the first and second steps of the said process contain the bulk of the oily matter of the corn, while the coarser product separated from them contains all the practically valuable starch-matters of the corn. Hence the advantages of my process are, first, that the oily portions of the Indian corn obtained by the first and second steps of the process are in a dry condition, in which state they may be kept for a length of time, and may be readily transported to a distant market for sale, instead of being liable to ferment and spoil, as they are when obtained by the liquid systems of separation, and this dry oil-containing matter obtained by my process approximates in value per pound that of the corn from which it is obtained, and its greater value than that of the wet products of the old processes reduces the cost of the glucose; secondly, the greater part of the oil-containing portion of the corn is separated by the dry treatment from the starchy portions before the latter are transformed into glucose, and I have found by experiment that a much larger proportion of glucose can be obtained from the starchy portions when thus freed, in whole or in part, from the oily portions than can be obtained by either of the two old processes, while, at the same time, my new process has the advantage of one of the old processes of saving the free sugar of the corn.

The first and second steps of my compound process may proceed simultaneously upon the same mass of Indian corn, provided suitable mechanical means be provided; and in order that my invention may be fully understood, I will proceed to describe the manner in which I have practiced it with success. The Indian corn (shelled from the ear and winnowed) is subjected to the action of a cracking, hulling, and separating mill—such, for example, as that described in the Wright patent of June 20, 1865. By the action of this mill the kernels of the corn are hulled, clipped, and cracked, and the hulls and fine clipped portions are separated from the granular cracked material. The purified or separated granular matter of the corn so obtained is then ground to meal or to flour by means of ordinary millstones—such, for example, as those used for grinding flour.

The corn meal or flour produced by the above two operations is subsequently transformed into glucose, and I prefer to employ diastase for that purpose, and to proceed as follows, viz: For each one hundred pound of the above-mentioned corn-flour I find it expedient to use six pounds of rye malt and fifty gallons of soft water. The water is heated to a temperature of 90° Fahrenheit, or thereabout, and the malt, finely ground, is thoroughly mixed through the water by stirring. The corn-flour is then stirred in, and the temperature is gradually raised while the stirring is continued until the mass attains a temperature of 165° Fahrenheit. The time required to attain this temperature may be one and one-half hour. The mass is maintained at the said temperature for five hours or thereabout, and the stirring is continued, by preference, during this period, although stirring is not essential. During this period the starch of the corn-flour is transformed into glucose, and the specific gravity of the liquid should be tested by a saccharometer to determine the condition of the sweet liquor, which should attain a density of 7° Baumé. If the liquor attains this density before the expiration of the period of five hours, the next step in the treatment may commence without waiting for the completion of the whole period, as but little more glucose is obtained by continuing the application of heat after the above density is reached.

The sweet liquor obtained as above is separated from the undissolved matters, is bleached, if desired, and is concentrated to the degree required by the market. The separation from insoluble matter may be effected by means of bag filters, such as those used for filtering solutions of sugar, and the solid residuum should be pressed to obtain the liquor with which it is saturated. If the glucose is to be bleached this operation may be effected by filtering the liquor from the bag filters through bone-black filters, such as are used for bleaching sugar. The concentration of the sweet liquor may be effected in a vacuum-pan, and may be extended until the liquor attains a density of from 38° to 45° Baumé, according to the requirements of the trade.

The process as above described is not restricted to the use of a particular kind or exact quantity of malt, as barley malt may be used for the purpose, and the quantity of malt used may be varied, as circumstances render expedient, the above-mentioned quantity of good malt being sufficient to produce a good result. Nor is the process restricted to the particular number of hours above mentioned for the performance of the several operations, because the time for performing each operation may be varied, as circumstances or the judgment of manufacturers may render expedient. Nor is the process restricted to the maintenance of the heat until the liquor attains a density of 7° Baumé, as manufacturers may deem it unnecessary to wait until the liquor attains that density, and may proceed with the filtration sooner.

The several steps of my compound process may be conveniently effected in the same establishment; but this is not essential, because the products of the first, second, and third steps are in a dry state, and therefore the valuable starchy matter may be packed and transported either in the condition of grains or in that of corn-meal or flour any desired distance. Hence the first step of the compound process, or the first and second steps, or the first, second, and third steps, may be practiced in establishments different from those in which the last step is performed. This circumstance is of great practical advantage, as the first steps may be performed in the great corn-producing regions of this country, and the dry oil-containing matters separated by the first and second steps may be used as feed for live stock, while the flour may be transported to the place of consumption of glucose, and the process may be completed there.

From the foregoing description it appears that my new process differs substantially from preceding processes for the production of glucose in the respect that according to them the grain is reduced directly to flour or meal, whereas according to mine the reduction to flour or meal is preceded by the dry granulation of the kernels and the dry purification of the granular starchy portions thereof from light and fine oil-containing portions of the grain.

The product of my new process differs from those of other processes in the following respects, viz: It differs from the product obtained from starch in the respect that my product contains the free sugar existing in the grain, which sugar is lost by the action of the liquid employed to separate the starch preparatory to its transformation into glucose. On the other hand, my new product differs from the products of the anterior processes, in which corn-meal is treated without purification preliminary to the fine grinding, in the respect that my product is depurated or practically free from the deleterious oily and glutinous matters (or the products of malt upon them) with which the products of these anterior processes are debased.

My new product differs, also, from the products of those anterior processes in which sulphuric acid is used, so far as I know, in the respect that those products always contain sulphates which are produced by the neutralization of the acid, and which are not separated completely by the filtering operations. My new manufacture of glucose being produced without the use of sulphuric acid is free from sulphates other than such as exist naturally in the corn.

I claim as my invention—

1. The process, substantially as before set forth, of producing glucose practically free from deleterious oily matters, and including free sugar of corn, consisting of the following operations, viz: first, granulating the corn in the dry state to detach oil-containing portions from the starchy portions of the grain, leaving leaving the latter in a granular state; second, purifying the dry granular starchy portions from light and fine oil-containing portions; third, reducing the purified granular starchy portions to flour; fourth, transforming the starch of the corn-flour into glucose.

2. The process, substantially as before set forth, of producing glucose practically free from deleterious oily matters and foreign sulphates, and including free sugar of corn, consisting of the following operations, viz: first, granulating the corn in the dry state to detach oil-containing portions from the starchy portions of the grain, leaving the latter in a granular state; second, purifying the dry granular starchy portions from light and fine oil-containing portions; third, reducing the purified granular starchy portions to flour; fourth, transforming the starch of the corn-flour into glucose by the diastase treatment.

3. As a new article of manufacture, the depurated glucose hereinbefore described, distinguishable by its inclusion of free non-crystallizable sugar of the corn from which it was manufactured, and by its practical freedom from oily matters, and from sulphates other than those contained in the corn.

Witness my hand this 24th day of April, A. D. 1878.

H. M. HARTSHORN.

Witnesses:
CLINTON FURBISH,
A. L. BAILEY.